US012764132B2

(12) United States Patent
Brown et al.

(10) Patent No.: US 12,764,132 B2
(45) Date of Patent: Oct. 13, 2026

(54) IRREGULAR INTERACTIVE COMMAND PROMPT ACTIVITY DETECTION

(71) Applicant: CrowdStrike, Inc., Sunnyvale, CA (US)

(72) Inventors: Daniel W. Brown, Ipswich, MA (US); Thomas R Hobson, Brookline, MA (US); Talha Ongun, Maiden, MA (US); Rico Valdez, Albuquerque, NM (US)

(73) Assignee: CrowdStrike, Inc., Sunnyvale, CA (US)

( * ) Notice: Subject to any disclaimer, the term of this patent is extended or adjusted under 35 U.S.C. 154(b) by 14 days.

(21) Appl. No.: 18/900,132

(22) Filed: Sep. 27, 2024

(65) Prior Publication Data

US 2026/0095465 A1 Apr. 2, 2026

(51) Int. Cl.
*H04L 9/40* (2022.01)

(52) U.S. Cl.
CPC ........ *H04L 63/1416* (2013.01); *H04L 63/102* (2013.01); *H04L 63/1425* (2013.01)

(58) Field of Classification Search
CPC ......................... H04L 63/102; H04L 63/1416; H04L 63/1425
USPC ........................................................... 726/22
See application file for complete search history.

(56) References Cited

U.S. PATENT DOCUMENTS

| | | | | |
|---|---|---|---|---|
| 11,792,210 | B2 * | 10/2023 | Brown | G06F 21/552 726/22 |
| 2015/0215329 | A1 * | 7/2015 | Singla | H04L 41/069 726/23 |
| 2017/0286671 | A1 * | 10/2017 | Chari | G06F 21/552 |
| 2018/0212985 | A1 | 7/2018 | Zadeh et al. | |
| 2019/0266323 | A1 | 8/2019 | Nguyen et al. | |
| 2020/0120153 | A1 * | 4/2020 | Morgan | H04L 67/025 |
| 2020/0322365 | A1 * | 10/2020 | Vaswani | G06F 21/62 |
| 2020/0412745 | A1 | 12/2020 | Kelly et al. | |
| 2022/0300609 | A1 | 9/2022 | Cotaie et al. | |
| 2023/0231859 | A1 | 7/2023 | Idan et al. | |
| 2024/0021197 | A1 * | 1/2024 | Liu | G10L 15/22 |
| 2024/0330445 | A1 * | 10/2024 | Shavit | G06F 21/562 |

(Continued)

OTHER PUBLICATIONS

Suspicious Windows Command Shell Arguments, Elastic, pp. 1-5 (2026) (available at https://www.elastic.co/docs/reference/security/prebuilt-rules/rules/windows/execution_windows_cmd_shell_susp_args) (Year: 2026).*

(Continued)

*Primary Examiner* — David P Zarka
(74) *Attorney, Agent, or Firm* — Lee & Hayes, P.C.

(57) ABSTRACT

Techniques are provided to detect irregular interactive command prompt activity. Interactive command prompt activity that is irregular for one user may be regular for another, and therefore the disclosed techniques determine whether interactive command prompt activity is irregular on a user-by-user basis. A sensor in a customer network can detect interactive command prompt use and send event data to a cloud service configured to score the irregularity of the interactive command prompt use. The score can optionally be combined with other information to determine whether alerting the customer network of potentially malicious activity is warranted.

20 Claims, 7 Drawing Sheets

(56) References Cited

U.S. PATENT DOCUMENTS

2025/0245344 A1* 7/2025 Singla .................. G06F 21/554

OTHER PUBLICATIONS

Suspicious Cmd Execution via WMI, Elastic, pp. 1-4 (2026) (available at https://www.elastic.co/docs/reference/security/prebuilt-rules/rules/windows/execution_suspicious_cmd_wmi) (Year: 2026).*

Searching for Malicious Activity in Windows using Command Line Logging and Process Trees, tekkix.com, pp. 1-12 (Sep. 2024) (available at https://tekkix.com/articles/security/2024/09/searching-for-malicious-activity-in-windows) (Year: 2024).*

* cited by examiner

IRREGULAR INTERACTIVE COMMAND PROMPT ACTIVITY DETECTION

BACKGROUND

Computer networks used by governments, companies, universities and other organizations are frequently attacked, and such attacks can result in enormous damage. Attacks may use any of multiple different approaches, and attack techniques are continuously evolving.

For example, some attacks may gain access to a host by finding a way to execute code as an already logged in user. Attacks may find and exploit a vulnerability or may trick a user into executing a binary. Other attacks may use compromised credentials to log into a host and then execute malicious code.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
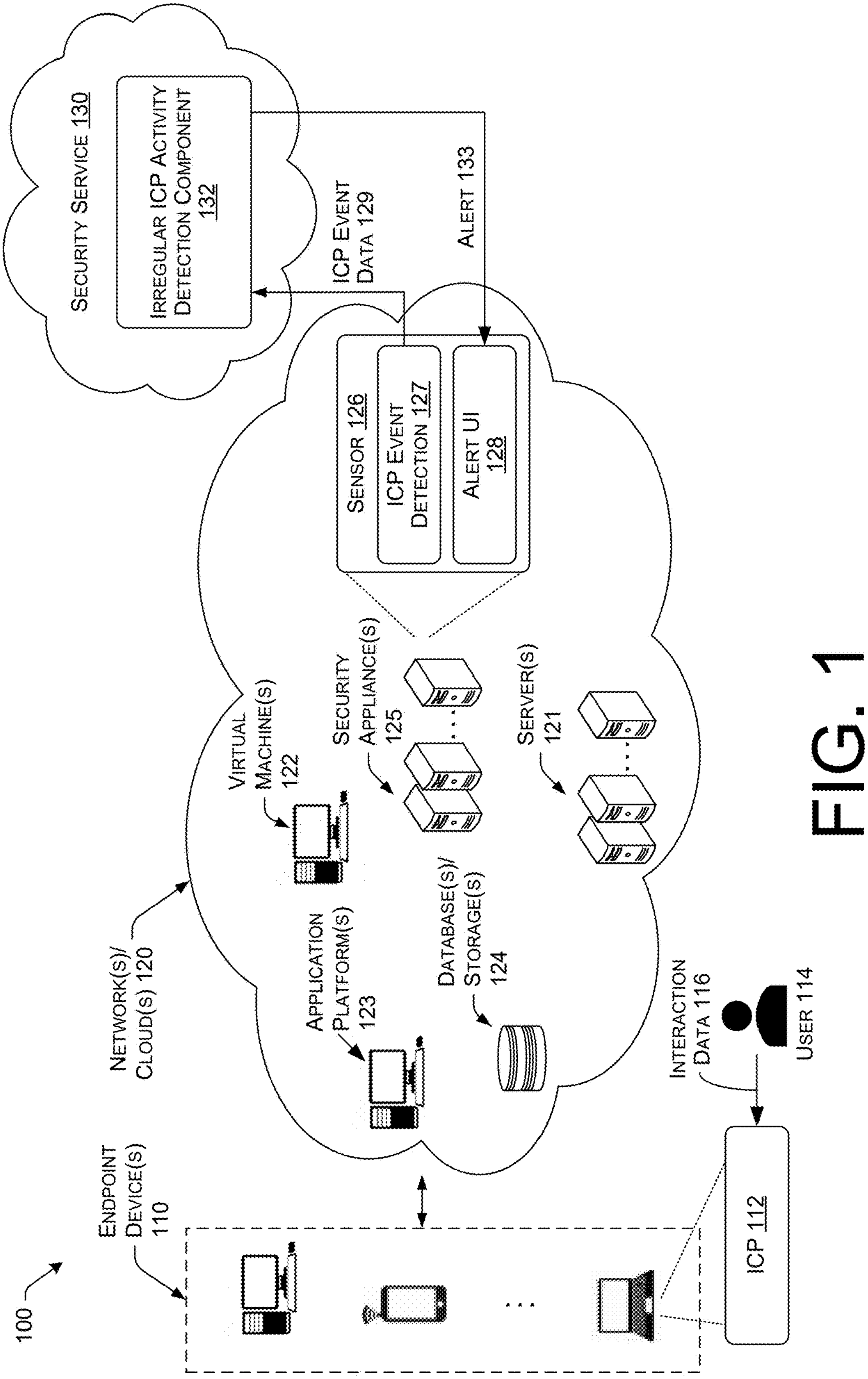
FIG. 1 illustrates an example network environment comprising a sensor to detect interactive command prompt (ICP) events, and a security service configured to determine whether the ICP events may be malicious based on the irregularity of the ICP events, in accordance with an embodiment of the present disclosure.

In the early stages of adversarial activity, attackers often employ interactive command prompts (ICPs) to probe and explore a compromised host's network environment and its vulnerabilities to malicious actions. The use of an ICP is typically a hands-on keyboard activity which involves typing commands to retrieve information about a system, network, and security controls in place. Resulting information can help the attacker identify potential vulnerabilities, misconfigurations, and other weaknesses which can be further exploited.

Investigating the use of ICPs in a computer network can therefore result in earlier detection of malicious activity. However, straightforward investigation of all ICP usage is unrealistic, as it will typically involve investigating large numbers of false positives. Most ICP activities are benign in most computer network environments, and so investigating all ICP activities would be a drain on an organization's security resources.

To reduce the number of false positives, some security solutions may analyze command contents of an ICP session. For example, some solutions may parse command contents and build detection methods, e.g., methods that apply machine learning or otherwise, to process parsed text and generate classifiers that identify malicious sessions. Other example solutions may apply rules to commands run within the command prompt, and the rules can trigger detections for further analysis.

However, all ICP commands can be used for benign as well as malicious purposes, and so approaches that reduce false positives by analyzing command contents of ICP sessions can often produce ineffective or otherwise misleading results. Also, such approaches inherently generate detections only after an attacker has executed commands via an ICP.

Therefore, there is a need for better approaches to reduce false positives in connection with attack detection techniques which analyze and evaluate ICP activity to identify potentially malicious activity within computer networks.

Techniques to detect irregular interactive command prompt activity are disclosed herein. Interactive command prompt activity that is irregular for one user may be regular for another, and therefore the disclosed techniques can determine whether interactive command prompt activity is irregular on a user-by-user basis. A sensor in a customer network can detect interactive command prompt use and send event data to a cloud service configured to score the irregularity of the interactive command prompt use. The score can optionally be combined with other information to determine whether alerting the customer network of potentially malicious activity is warranted.

In order to effectively detect and investigate malicious ICP activity, detection approaches are needed which reduce noise, i.e., false positives. Effective noise reduction should reliably uncover ICP activities that could indicate an attack, without flagging too many benign ICP activities. This disclosure observes that unusual or irregular ICP activities are typically correlated with attacks. The techniques described herein can therefore detect irregular ICP activities and can optionally score the irregular ICP activities as part of determining whether to alert a customer of suspicious activity on their network.

In one example of irregular ICP activity, it is observed that certain users tend to use ICPs frequently, while some others use ICPs either rarely or never. Therefore, any ICP use by a user who rarely or never uses ICPs can be considered irregular. Scores can be assigned based on a degree of irregularity, which can be derived for example from an amount of time since a user's previous ICP use. Other examples of irregular ICP activity may comprise, e.g., a user's use of a different type of ICP which differs from the user's typical ICP type, or a user's use of a different access type, such as a remote logon session, when using an ICP, when the user typically uses the ICP during a local logon session.

A detection system disclosed herein can be configured to determine irregular ICP use based on activity history per user. The detection system can identify unusual invocations of ICPs. Unusual invocations of ICPs can comprise, e.g., invocations by a user who is not a typical ICP user, invocations in which a user is using a different ICP than usual, or invocations in which the user accesses an ICP in a different manner than usual.

In some examples, most malicious activities may be performed remotely. Under these conditions, some implementations can focus primarily or exclusively on users that logged on remotely. In other examples malicious activity by locally logged in users may be observed, e.g., by attackers gaining local access through vulnerabilities or hijacking a user session. In such other examples, implementations can optionally be configured to keep track of users in local and remote contexts separately.

With regard to irregular ICP invocations in which a user is using a different type of ICP than usual, some implementations can incorporate an ICP application name, e.g., cmd.exe, powershell.exe, or any other ICP application name, as a discriminator for tracking user activity. In WINDOWS® type systems, any console application that uses conhost.exe can be considered an ICP application, including built-in applications like cmd.exe and powershell.exe, as well as any third-party software that may be installed by users. By monitoring all executions of these applications separately, the disclosed techniques can identify and flag activities using ICP applications which are unusual for individual users. For example, a user Bob may always use cmd.exe. Bob's first time usage of powershell.exe can be considered irregular.

In another aspect, degrees of irregularity can be scored, and the score can be used, optionally along with other information, to determine whether to generate an alert requiring further investigation. An example scoring technique can score user activities based on a previous occurrence of a user conducting a similar activity. The score can increase along with an amount of elapsed time since the previous occurrence of the similar activity. The score can optionally be combined with other scores pertaining to other suspicious activities, and a combined score can be compared against a threshold over which an alert is generated for further investigation. The threshold can optionally be customized based on an organization's budget or resources available for security investigations.

Example implementations are provided below with reference to the following figures.

FIG. 1 illustrates an example network environment 100 comprising a sensor 126 to detect interactive command prompt (ICP) events, and a security service 130 configured to determine whether the ICP events may be malicious based on the irregularity of the ICP events, in accordance with an embodiment of the present disclosure.

FIG. 1 comprises endpoint device(s) 110, network(s)/cloud(s) 120, and the security service 130. The network(s)/cloud(s) 120 can include server(s) 121, virtual machine(s) 122, application platform(s) 123, database(s)/storage(s) 124, and security appliance(s) 125. The security appliance(s) 125 can comprise the sensor 126, which may also be referred to as a security agent. Alternatively, the sensor 126 can be implemented at any devices in the network(s)/cloud(s) 120 or in the endpoint device(s) 110.

The endpoint device(s) 110 and/or other devices within the network(s)/cloud(s) 120 can comprise ICPs such as the ICP 112, for use by users such as the user 114. For example, the user 114 may interact with the ICP 112 by opening the ICP 112 and entering interaction data 116, such as ICP commands, into the ICP 112. The sensor 126 can comprise, inter alia, ICP event detection 127 and alert user interface (UI) 128. The ICP event detection 127 can detect user 114 interactions with the ICP 112 and can send corresponding ICP event data 129 to the security service 130.

The security service 130 can comprise, inter alia, an irregular ICP activity detection component 132. The irregular ICP activity detection component 132 can determine, based at least in part on the irregularity of the ICP event data 129, whether the ICP event data 129 represents potentially malicious activity. If so, the security service 130 and/or the irregular ICP activity detection component 132 return an alert 133 to the network(s)/cloud(s) 120, e.g., to the alert UI 128 provided by the sensor 126.

In some examples, the sensor 126 can be configured to detect processes that execute within the network(s)/cloud(s) 120, as well as activities of the processes, referred to as events. The sensor 126 can send detected events to the security service 130. The security service 130 can be configured to analyze the events and determine whether any of the events are indicative of potentially malicious activity in the network(s)/cloud(s) 120. If potentially malicious activity, such as a potentially malicious use of the ICP 112, is discovered by the security service 130, then the security service 130 can send an alert 133 to the sensor 126. The sensor 126 can be configured to optionally conduct further analysis, or prompt a human analyst to conduct further analysis, and can take or facilitate preventive actions as needed to protect the network(s)/cloud(s) 120 from attack.

In further aspects of FIG. 1, the one or more endpoint device(s) 110 can access, through a network, a variety of resources located in the network(s)/cloud(s) 120. The one or more security appliance(s) 125 can optionally be configured to provide security functions for devices in the network(s)/cloud(s) 120 as well as for endpoint device(s) 110, such as an intrusion detection or prevention system (IDS/IPS), denial-of-service (DoS) attack protection, session monitoring, and other security services. The sensor 126 can comprise a variety of functions that facilitate security of network(s)/cloud(s) 120. In an example, the sensor 126 can be implemented as a FALCON® type agent made by the CROWDSTRIKE® Corporation, and the network(s)/cloud(s) 120 can comprise a private network operated by a business, university, government agency or other entity.

In various examples, the endpoint device(s) 110 can comprise any devices that can connect to the networks/cloud(s) 120, either wirelessly or via direct cable connections. For example, the endpoint device(s) 110 may include but are not limited to mobile telephones, personal digital assistants (PDAs), media players, tablet computers, gaming devices, smart watches, hotspots, personal computers (PCs) such as laptops, desktops, or workstations, or any other type of computing or communication device. In other examples, the endpoint device(s) 110 may comprise vehicle-based devices, wearable devices, wearable materials, virtual reality (VR) devices, smart watches, smart glasses, clothes made of smart fabric, etc.

In various examples, the network(s)/cloud(s) 120 can be a public cloud, a private cloud, or a hybrid cloud and may host a variety of resources such as one or more server(s) 121, one or more virtual machine(s) 122, one or more application platform(s) 123, one or more database(s)/storage(s) 124, etc. The server(s) 121 may include the pooled and centralized server resources related to application content, storage, and/or processing power. The application platform(s) 123 may include one or more cloud environments for designing, building, deploying and managing custom business applications. Virtual desktop(s) may image operating systems and applications of a physical device, e.g., any of endpoint device(s) 110, and allow users to access their desktops and applications from anywhere on any kind of endpoint devices. The database(s)/storage(s) 124 may include one or more of file storage, block storage or object storage.

It should be understood that the one or more server(s) 121, one or more virtual machine(s) 122, one or more application platform(s) 123, and one or more database(s)/storage(s) 124 illustrate multiple functions, available services, and available resources provided by the network(s)/cloud(s) 120. Although shown as individual network participants in FIG. 1, the server(s) 121, the virtual machine(s) 122, the application platform(s) 123, and the database(s)/storage(s) 124 can be integrated and deployed on one or more computing devices and/or servers in the network(s)/cloud(s) 120.

In implementations, the security appliance(s) 125 can comprise any types of firewalls. Example firewalls include a packet filtering firewall that operates inline at junction points of network devices such as routers and switches. A packet filtering firewall can compare each packet received to a set of established criteria, such as the allowed IP addresses, packet type, port number and other aspects of the packet protocol headers. Packets that are flagged as suspicious are dropped and not forwarded. Example firewalls may further include a circuit-level gateway that monitors transmission control protocol (TCP) handshakes and other network protocol session initiation messages across the network to determine whether the session being initiated is legitimate. Example firewalls may further include an application-level gateway (also referred to as a proxy firewall) that filters packets not only according to the service as specified by the destination port but also according to other characteristics, such as the hypertext transfer protocol (HTTP) request string. Yet another example firewall may be a stateful inspection firewall that monitors an entire session for a state of a connection, while also checking internet protocol (IP) addresses and payloads for more thorough security. A next-generation firewall, as another example firewall, can combine packet inspection with stateful inspection and can also include some variety of deep packet inspection (DPI), as well as other network security systems, such as IDS/IPS, malware filtering and antivirus functions.

In various examples, the security appliance(s) 125 can be deployed as one or more hardware-based appliances, software-based appliances, and/or cloud-based services. A hardware-based appliance may also be referred to as network-based appliance or network-based firewall. The hardware-based appliance can act as a secure gateway between the networks/cloud(s) 120 and the endpoint device(s) 110 and can protect the devices/storages inside the perimeter of the networks/cloud(s) 120 from being attacked by malicious actors.

Additionally or alternatively, the security appliance(s) 125 can be implemented on a cloud device. The security appliance(s) 125 can comprise or can cooperate with a cloud-based security service 130 provided through a managed security service provider (MSSP). A cloud-based service can be delivered to various network participants on demand and configured to track both internal network activity and third-party on-demand environments. In some examples, the security appliance(s) 125 can comprise software-based appliances implemented in part on any of the devices in the network(s)/cloud(s) 120 and/or on the endpoint device(s) 110. Software-based appliances may also be referred to as host-based appliances or host-based firewalls. Software-based appliances may include the sensor 126 or portions thereof, anti-virus software, firewall software, etc., that can be installed on devices in the network(s)/cloud(s) 120 and/or on the endpoint device(s) 110.

In FIG. 1, the security appliance(s) 125 are shown as individual devices and/or individual cloud participants. However, it should be understood that the network environment 100 may include multiple security appliance(s) respectively implemented on the endpoint device(s) 110 and/or the network(s)/cloud(s) 120. As discussed herein, the security appliance(s) 125 can comprise a hardware-based firewall, a software-based firewall, a cloud-based firewall, or any combination thereof.

Figure 2:
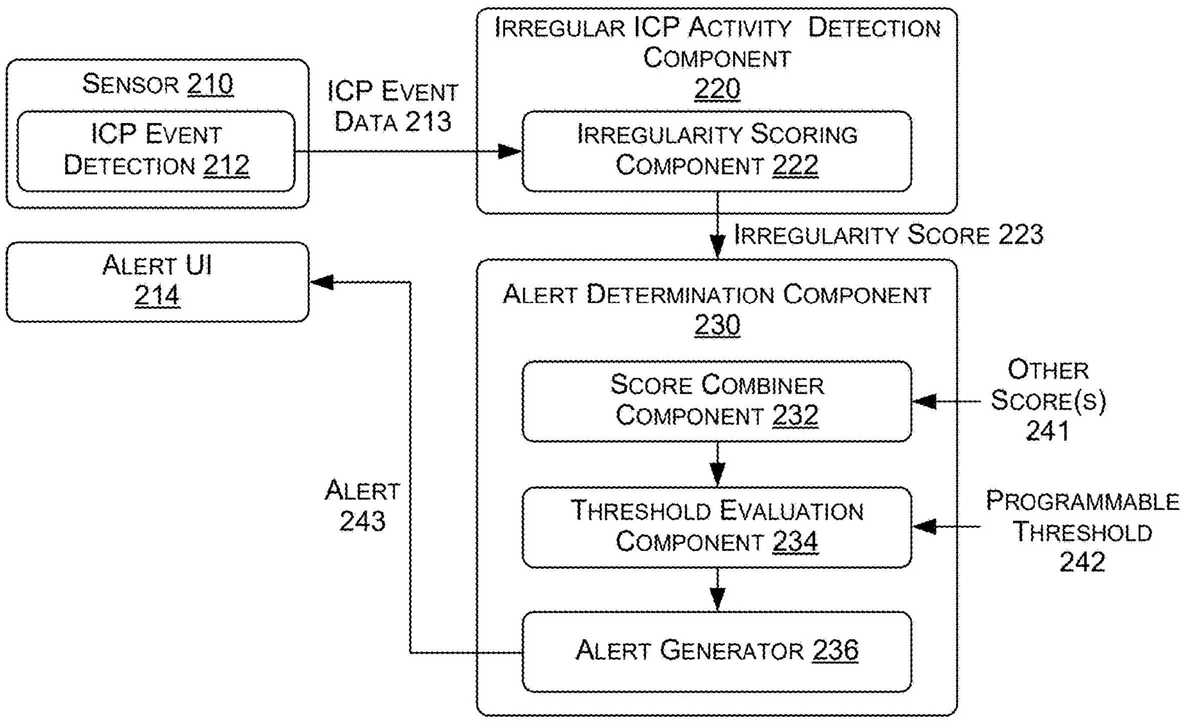
FIG. 2 illustrates an example sensor, irregular ICP activity detection component, alert determination component, and alert UI that may be deployed in an architecture such as illustrated in FIG. 1, in accordance with an embodiment of the present disclosure.

FIG. 2 illustrates an example sensor 210, irregular ICP activity detection component 220, alert determination component 230, and alert UI 214 that may be deployed in a network environment 100 such as illustrated in FIG. 1, in accordance with an embodiment of the present disclosure. The sensor 210 comprises ICP event detection 212. The irregular ICP activity detection component 220 comprises an irregularity scoring component 222. The alert determination component 230 comprises a score combiner component 232, a threshold evaluation component 234, and an alert generator 236.

FIG. 2 illustrates a different example arrangement of components than introduced in FIG. 1. In FIG. 2, the sensor 210 and the alert UI 214 are illustrated as separate components, however, the sensor 210 and the alert UI 214 can both optionally be implemented in the network(s)/cloud(s) 120 illustrated in FIG. 1, in place of the sensor 126 in FIG. 1. Also, the irregular ICP activity detection component 220 and the alert determination component 230 are illustrated as separate components, however, the irregular ICP activity detection component 220 and the alert determination component 230 can both optionally be implemented in the security service 130 illustrated in FIG. 1, in place of the irregular ICP activity detection component 132 in FIG. 1. It will be appreciated that the various components described herein can optionally be separated and implemented in any desired location(s) to suit the needs of particular embodiments.

In an example according to FIG. 2, the ICP event detection 212 can be configured to generate an ICP event comprising ICP event data 213 each time a user 114 interacts with an ICP 112 at any of endpoint device(s) 110 or at any other devices connected to network(s)/cloud(s). The user 114 may interact with an ICP 112 for example by entering interaction data 116 in a field thereof. For example, in some embodiments, the act of beginning to type a command into an ICP 112 may be detected by ICP event detection 212, and this may trigger generation of an ICP event, regardless of whether the user 114 completes or executes the command (e.g., by pushing the "enter" key). In other examples, the act of completing or executing the command (e.g., by pushing the "enter" key) may be detected by ICP event detection 212 and may trigger generation of an ICP event.

The above described user 114 interactions can be distinguished from the user 114 or an automated process opening or initiating an ICP 112, without the user 114 also interacting with the ICP 112. The mere initiation of an ICP 112, or the use of the ICP 112 by an automated process (rather than manual use by the user 114) need not trigger generation of an ICP event and corresponding ICP event data 213 in some implementations.

The ICP event data 213 can include any desired data. In some examples, the ICP event data 213 can comprise a user identification of the user 114 logged in at the device that runs the ICP 112. The ICP event data 213 can further comprise time information, such as a date and time of the user 114 interaction with the ICP 112.

In some implementations, the ICP event data 213 can further comprise the interaction data 116 entered by the user 114 into the ICP 112. However, it should be noted that regardless of whether the ICP event data 213 includes the interaction data 116, the irregularity analysis performed by the ICP activity detection component 220 can optionally be independent of the interaction data 116. In other words, in some embodiments, the irregularity analysis performed by the ICP activity detection component 220 can be based independently on an occurrence of an interaction. The irregularity analysis performed by the ICP activity detection component 220 can, but need not necessarily, also be based on the content of the interaction data 116.

In some examples, the ICP event data 213 can optionally furthermore include ICP type information. There are several different applications that can provide ICPs, and the ICP type information can identify the application that provided the ICP 112. Example applications include cmd.exe and powershell.exe.

In some further examples, the ICP event data 213 can optionally furthermore include an access type associated with the user 114 access to the network(s)/cloud(s) 120. The access type can comprise, e.g., a remote access type when the user 114 has logged in remotely, or a local access type when the user 114 has logged in locally.

The ICP event detection 212 can generate an ICP event comprising ICP event data 213 and the ICP event detection 212 can send the ICP event to the security service 130, which can comprise the irregular ICP activity detection component 220 and the alert determination component 230 illustrated in FIG. 2. Upon receiving the ICP event data 213, the irregular ICP activity detection component 220 can evaluate the irregularity of the ICP event data 213. The alert determination component 230 can then determine, based at least in part on the evaluation of the irregularity of the ICP event data 213, whether to generate an alert 243 to warn the customer operating the network(s)/cloud(s) of potentially malicious activity.

The irregular ICP activity detection component 220 can evaluate the ICP event data 213 by using the irregularity scoring component 222 to generate a score and assigning the score to the ICP event data 213. An example scoring technique can be based on an amount of time elapsed since a previous instance of the ICP interaction occurrence detailed by the ICP event data 213. For example, the irregularity scoring component 222 can determine, based on user activity data, when the user 114 previously interacted with the ICP 112. The time of the previous interaction can be used to establish an amount of time elapsed since the previous interaction. The irregularity scoring component 222 can then generate an irregularity score 223 for the occurrence defined by the ICP event data 213 based on the amount of time elapsed. An example irregularity scoring component is further described with reference to FIG. 3 and FIG. 4.

The alert determination component 230 can determine whether to generate an alert 243, based at least in part on the irregularity score 223. In one example implementation, the score combiner component 232 may combine the irregularity score 223 with one or more other scores 241 generated by other components of the security service 130. Example other scores 241 can comprise any other scores pertaining to activities that may be related to the ICP event data 213, e.g., scores relating to other activities of the user 114 or device(s) accessed by the user 114. The score combiner component 232 may optionally generate a straightforward combination of scores, or can generate a weighted combination.

The threshold evaluation component 234 can compare a combined score produced by the score combiner component 232 against a programmable threshold 242. When the combined score exceeds the programmable threshold 242, the alert generator 236 can be activated to generate the alert 243 and send the alert 243 to the alert UI 214. When the combined score does not exceed the programmable threshold 242, the alert generator 236 need not be activated and the alert 243 need not be generated.

For example, a combined score of eight would exceed a programmable threshold 242 of five, thereby triggering activation of the alert generator 236. In contrast, a combined score of four would not exceed the programmable threshold 242 of five, so the alert generator 236 would not be activated.

The use of a programmable threshold 242 allows different organizations to tune their desired aggressiveness in investigating potential malicious activity. Some organizations such as banks may commit significant resources to security and may set lower thresholds to investigate threats. Other organizations may not possess large amounts of sensitive data and may commit fewer resources to security by setting higher thresholds to investigate threats.

The alert UI 214 can receive and display the alert 243 along with other alerts, for investigation by security analysts working on behalf of the network(s)/cloud(s) 120. The alert UI 214 can optionally classify alerts in different categories, e.g., according to levels of perceived urgency, or according to affected devices or type of threat. The alert UI 214 can also optionally provide any number of investigation and response tools to help analysts retrieve further information to understand whether the threat warrants further action, and to take such actions as may be necessary.

Figure 3:
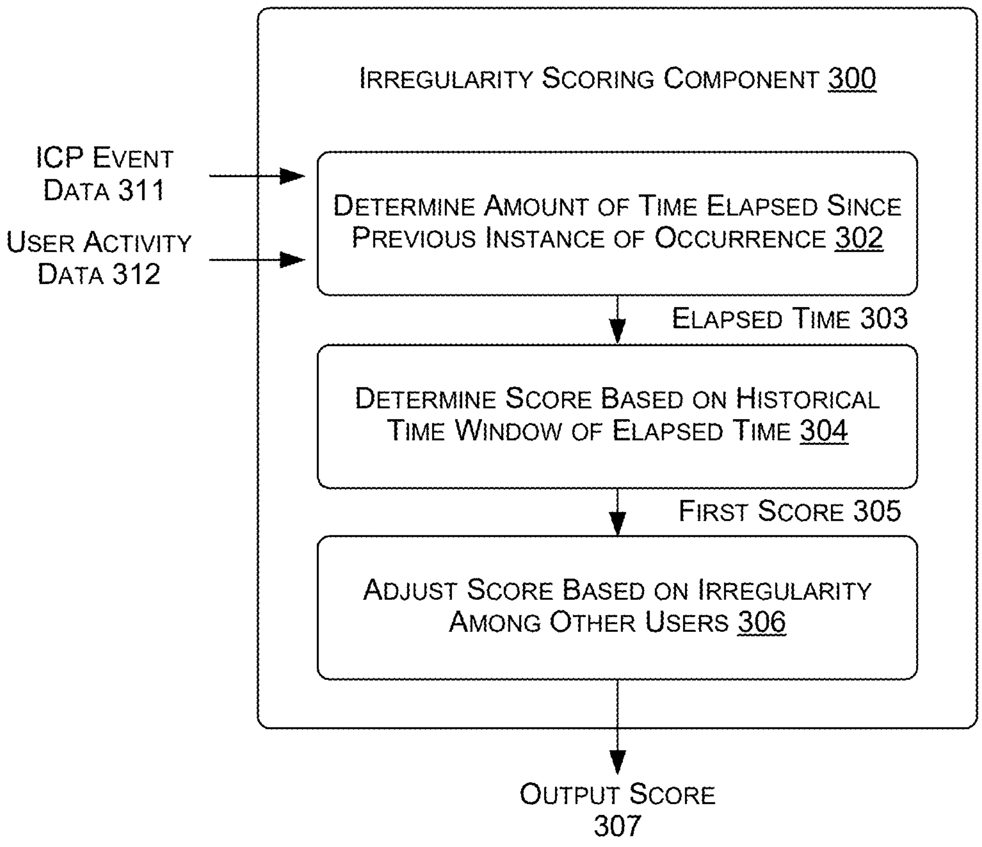
FIG. 3 illustrates an example irregularity scoring component that may be deployed in an irregular ICP activity detection component such as illustrated in FIG. 2, in accordance with an embodiment of the present disclosure.

FIG. 3 illustrates an example irregularity scoring component 300 that may be deployed in an irregular ICP activity detection component 220 such as illustrated in FIG. 2, in accordance with an embodiment of the present disclosure. The irregularity scoring component 300 can implement the irregularity scoring component 222 in some embodiments. The irregularity scoring component 300 comprises, "determine amount of time elapsed since previous instance of the occurrence" 302, "determine score based on historical time window of elapsed time" 304, and "adjust score based on irregularity among other users" 306.

In an example operation of the irregularity scoring component 300, at "determine amount of time elapsed since previous instance of the occurrence" 302, the irregularity scoring component 300 can be configured to compare a time of an ICP interaction occurrence indicated with the ICP event data 311 with a time of a previous instance of such occurrence in user activity data 312.

The occurrence scored by the irregularity scoring component 222 can be defined in any of several ways. In one example, the occurrence can optionally be defined as any user 114 interaction with any ICP 112. The irregularity scoring component 300 can look in user activity data 312 for any previous user 114 interaction with any ICP 112 and can generate a corresponding score based on the time since the previous user 114 interaction.

In another example, the occurrence can optionally be defined as a user 114 interaction with an ICP 112 which is of a defined access type (e.g., remote or local access type). The irregularity scoring component 300 can look in user activity data 312 for any previous user 114 interaction with an ICP 112 which is of a same access type as the occurrence detailed in ICP event data 311, and irregularity scoring component 300 can generate a corresponding score based on the time since the previous user 114 interaction.

In a further example, the occurrence can optionally be defined as a user 114 interaction with an ICP 112 which is of a defined ICP type (e.g., cmd.exe or powershell.exe). The irregularity scoring component 300 can look in user activity data 312 for any previous user 114 interaction with an ICP 112 which is of a same ICP type as the occurrence detailed in ICP event data 311, and irregularity scoring component 300 can generate a corresponding score based on the time since the previous user 114 interaction.

Furthermore, some embodiments may apply combinations of the above, e.g., some embodiments may be configured to score an occurrence in multiple ways and select a highest score. Also, embodiments may configure and store user activity data 312 based on previously received ICP events, or otherwise, and the user activity data 312 may comprise different data structures for lookups of, e.g., previous occurrences of a same ICP type.

Figure 4:
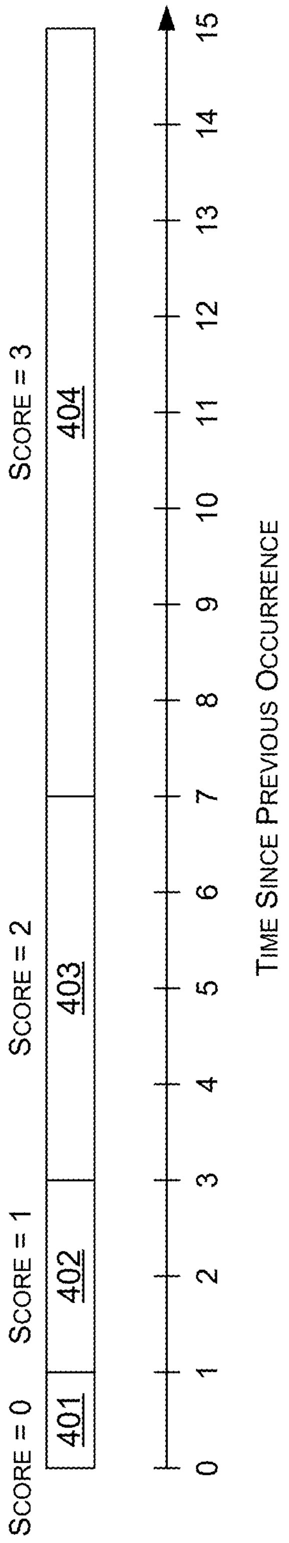
FIG. 4 illustrates example historical time windows that can be used to score ICP events, in accordance with an embodiment of the present disclosure.

The result of "determine amount of time elapsed since previous instance of the occurrence" 302 can comprise an elapsed time 303. At "determine score based on historical time window of elapsed time" 304, the irregularity scoring component 300 can compare the elapsed time 303 with time windows such as illustrated in FIG. 4 to determine a score for the occurrence defined in the ICP event data 311. FIG. 4 is discussed below, with a return to FIG. 3 after the discussion of FIG. 4.

FIG. 4 illustrates example historical time windows that can be used to score ICP events, in accordance with an embodiment of the present disclosure. FIG. 4 illustrates a timeline showing time since a previous occurrence. The timeline includes equal length time periods 1-15. Each time period can be, e.g., 6 hours, 12 hours, one day, one week, or any other period. At the beginning of period 0, no time has elapsed since the previous occurrence. At period 1, one period has elapsed, at period 2, two periods have elapsed, etc.

A first example time window 401 begins at zero and is one period in length, ending at period 1. A score of 0 is associated with the first time window 401. A second example time window 402 begins at 1 and is two periods in length, ending at period 3. A score of 1 is associated with the second time window 402. A third example time window 403 begins at 3 and is four periods in length, ending at period 7. A score of 2 is associated with the third time window 403. A fourth example time window 404 begins at 7 and is eight periods in length, ending at period 15. A score of 3 is associated with the fourth time window 404. Additional time windows and scores can be included for longer timelines.

Using the scoring system illustrated in FIG. 4, when an elapsed time falls in the time window 401, it can be scored at 0. When an elapsed time falls in the time window 402, it can be scored at 1. When an elapsed time falls in the time window 403, it can be scored at 2. When an elapsed time falls in the time window 404, it can be scored at 3.

The illustrated scoring system uses windows of increasing length, however other scoring systems can use equal length windows or any other variation in window length as desired for particular embodiments.

In the example scoring technique, the score can be based on a historical time window comprising the amount of time elapsed since the previous instance of the occurrence. A first historical time window can comprise a first historical time period, e.g., the previous zero days to one day ago. A second historical time window can comprise a second historical time period, e.g., the previous one day to three days ago. A second historical time window can comprise a third historical time period, e.g., the previous three days to seven days ago. Further historical periods can likewise be used. An example score can be incremented by one (or otherwise increased) at each historical time period. For example, as shown in FIG. 4, a score of zero may be used for the first historical time window, a score of one may be used for the second historical time window, a score of two may be used for the third historical time window, and so on. The above example is just one possible scoring technique and this disclosure appreciates that a wide variety of scoring variations are feasible.

Returning now to FIG. 3, at "determine score based on historical time window of elapsed time" 304, the irregularity scoring component 300 can determine a score for the occurrence defined in the ICP event data 311 using a technique such as illustrated in FIG. 4. The result can be a first score 305 which can optionally be adjusted as described below.

At "adjust score based on irregularity among other users," 306, the irregularity scoring component 300 can optionally adjust the first score 305 based on irregularity information derived from other users of the network(s)/cloud(s) 120. For example, it may be highly irregular or unusual for the user 114 to use any ICP 112. However, when looking at other users in the network environment 100, such highly irregular use may be very common across the network environment 100. In that case, the first score 305 can be decreased based on the other user irregularity information.

Conversely, when looking at other users in the network environment 100, irregular ICP use may be very unusual for most or all users across the network environment 100. In that case, the first score 305 can be increased based on the other user irregularity information. The result of adjusting the score can comprise an output score 307, which can be provided as the irregularity score 223 to the alert determination component 230 illustrated in FIG. 2.

Figure 5:
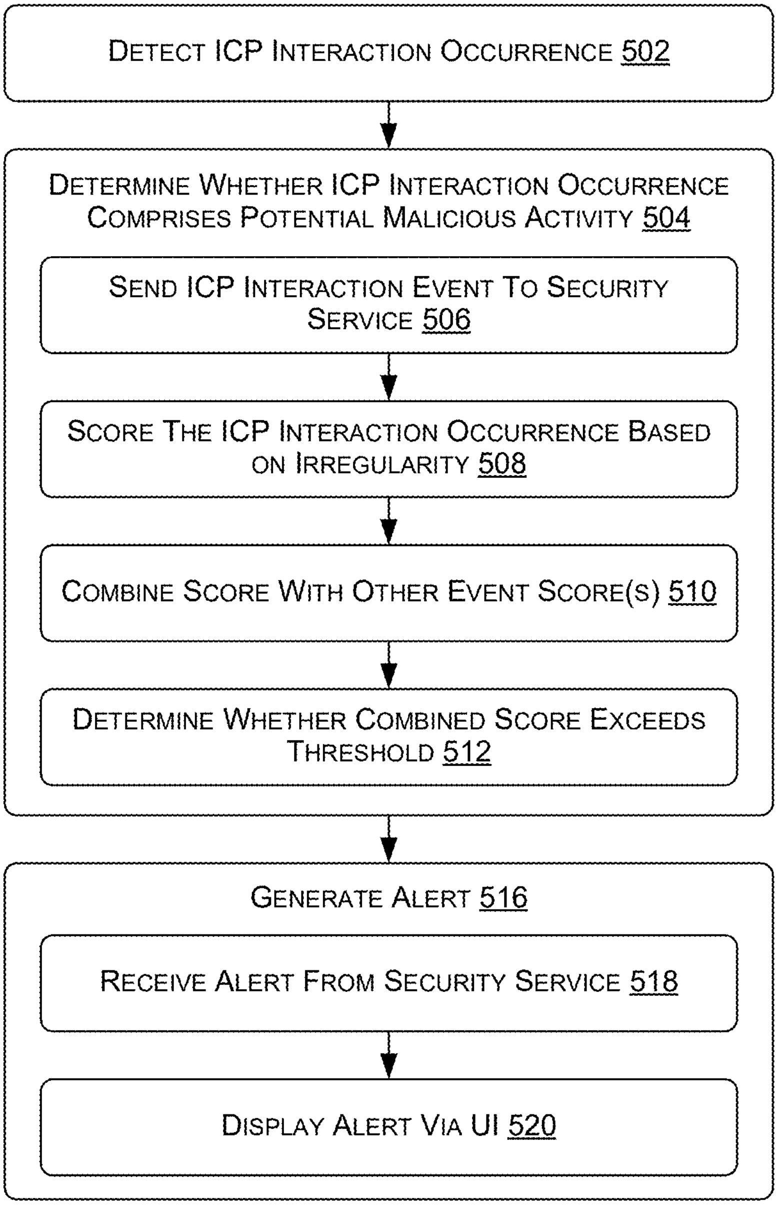
FIG. 5 illustrates an example method performed by a sensor deployed in a customer network, in accordance with an embodiment of the present disclosure.

FIG. 5 illustrates an example method performed by a sensor deployed in a customer network, in accordance with an embodiment of the present disclosure. By way of example and without limitation, the method is illustrated in FIG. 5 as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 5 can be performed at least in part by a sensor 126 such as illustrated in FIG. 1. At operation 502, the ICP event detection 127 can detect an ICP interaction occurrence between a user 114 of a customer network such as the network(s)/cloud(s) 120 and an ICP 112 at the customer network. The interaction between the user

114 of the customer network and the ICP 112 at the customer network can comprise, e.g., an entry of interaction data 116 into the ICP 112.

At operation 504, the sensor 126 can determine whether the occurrence comprises potential malicious activity at the customer network. Determining whether the occurrence comprises potential malicious activity can be done locally at the sensor 126, or elsewhere within the network(s)/cloud(s) 120 of the customer network, or via interactions with the security service 130 as described herein. Operation 504 can comprise, e.g., operations 506, 508, 510, and 512.

Operation 506 comprises sending an ICP interaction event, e.g., the ICP event data 129, to the security service 130. In embodiments incorporating operation 506, determining whether the occurrence comprises potential malicious activity at the customer network can comprise sending, by the sensor 126, an indication of the occurrence (e.g., in the ICP event data 129) to a cloud service such as the security service 130, and the cloud service can assign a score to the occurrence.

At operation 508, the sensor 126 or the security service 130 can score the ICP occurrence based on irregularity. Determining whether the occurrence comprises potential malicious activity can comprise assigning a score to the occurrence, and the score can be based on irregularity of the occurrence with respect to the user 114. In some implementations, the score can also optionally be independent of the interaction data 116. That is, the score can be unaffected by the content of the interaction data 116, and can be based instead on the occurrence of the interaction.

The irregularity of the occurrence can be determined, for example, at least in part based on an amount of time elapsed since a previous instance of the occurrence. The occurrence can be defined several different ways as described herein, and the amount of time can be converted to a score in any desired approach, e.g., using the historical time windows illustrated in FIG. 4 or otherwise. Furthermore, the score can optionally be based on irregularity of the occurrence with respect to one or more other users of the customer network, e.g., other than the user 114, as described herein.

At operation 510, the score determined at operation 508 can optionally be combined with other event score(s), resulting in a combined score. For example, other events that may be related to the ICP event data 129, or to the user 114, or to any associated network devices, can be scored and those scores can optionally be combined with the score assigned to the ICP interaction occurrence. At operation 512, the (optionally combined) score can be compared to a threshold score to determine whether the threshold is exceeded. The threshold can optionally be programmable as described herein. If the threshold is exceeded, then operation 516 can be activated to generate an alert. If the threshold is not exceeded, then operation 516 need not be activated.

Operation 516 can comprise generating an alert in response to a determination, e.g., at operation 504, that the occurrence comprises potential malicious activity at the customer network. Generating an alert can be initiated locally at the sensor 126, e.g., in embodiments wherein operation 504 is performed locally, or generating the alert can be initiated at the security service 130. In embodiments that employ the security service 130, generating the alert can include operation 518, comprising receiving, at the customer network, alert data corresponding to the alert 133 from a cloud service such as the security service 130. At operation 520, the alert can be displayed via the alert UI 128.

Figure 6:
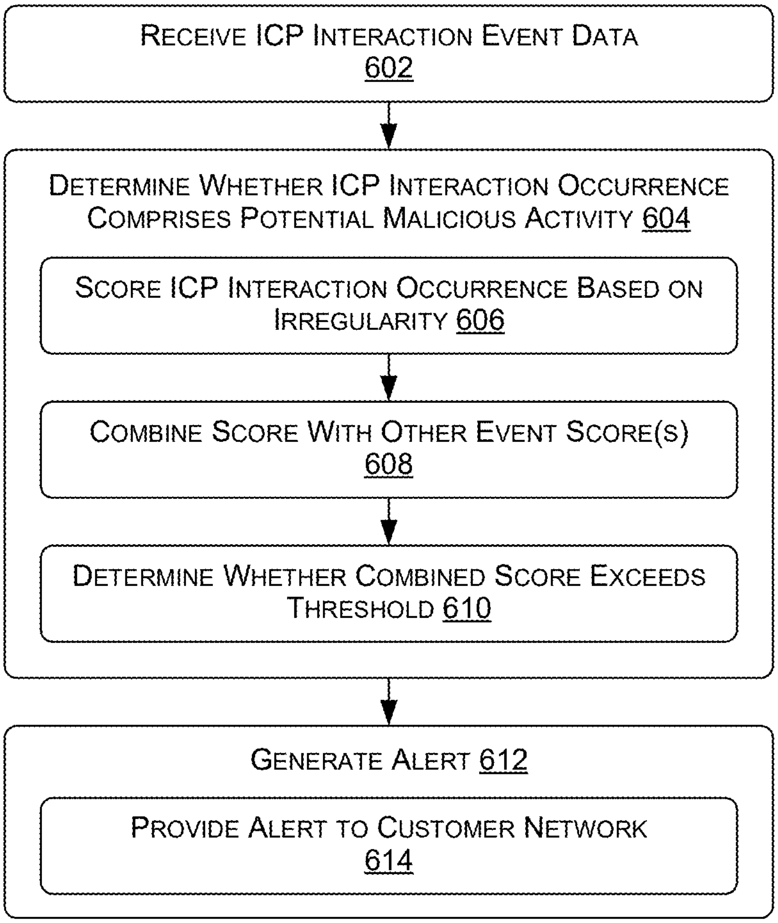
FIG. 6 illustrates an example method performed by a security service equipped to identify potentially malicious ICP events, in accordance with an embodiment of the present disclosure.

FIG. 6 illustrates an example method performed by a security service 130 equipped to identify potentially malicious ICP events, in accordance with an embodiment of the present disclosure. By way of example and without limitation, the method is illustrated in FIG. 6 as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 6 can be performed at least in part by a security service 130 such as illustrated in FIG. 1. Operation 602 comprises receiving ICP event data 129. The ICP event data 129 can be received from a sensor 126 deployed in a customer network such as the network(s)/cloud(s) 120. The ICP event data 129 can comprise, inter alia, an indication of an occurrence of an interaction between a user 114 of the customer network and an ICP 112 at the customer network. The interaction between the user 114 of the customer network and the ICP 112 at the customer network can comprise, e.g., an entry of interaction data 116 into the ICP 112.

At operation 604, the security service 130 can determine whether the occurrence defined by the data received at operation 602 comprises potentially malicious activity. Operation 604 can comprise, e.g., operations 606, 608, and 610.

At operation 606, the security service 130 can assign a score to the ICP interaction occurrence. The score can be based on irregularity of the occurrence with respect to the user 114. The score can optionally also be independent of the interaction data 116. In some embodiments, the irregularity of the occurrence and therefore the score can be determined at least in part based on an amount of time elapsed since a previous instance of the occurrence. The score can optionally be further based on irregularity of the occurrence with respect to one or more other users of the customer network, as described herein.

In some instances, the score can be based on irregularity of the occurrence with respect to the user 114 and an ICP type, e.g., cmd.exe or powershell.exe, associated with the ICP 112. The score may also optionally be based on irregularity of the occurrence with respect to the user 114 and an access type associated with the user's access to the customer network, wherein the access type can comprise, e.g., a remote access type or a local access type.

Operation 608 can comprise combining the score with other event score(s), and operation 610 can comprise determining whether the combined score exceeds a threshold, as described with respect to operations 510 and 512, respectively, illustrated in FIG. 5.

At operation 612, the security service 130 can determine, based at least in part on the (optionally combined) score, whether to generate an alert 133. The alert 133 can be provided to the customer network, e.g., to the sensor 126, and the alert 133 can identify the occurrence as potential malicious activity at the customer network. The alert 133 can optionally include any other data to assist in classifying, researching, or resolving the potential threat.

Figure 7:
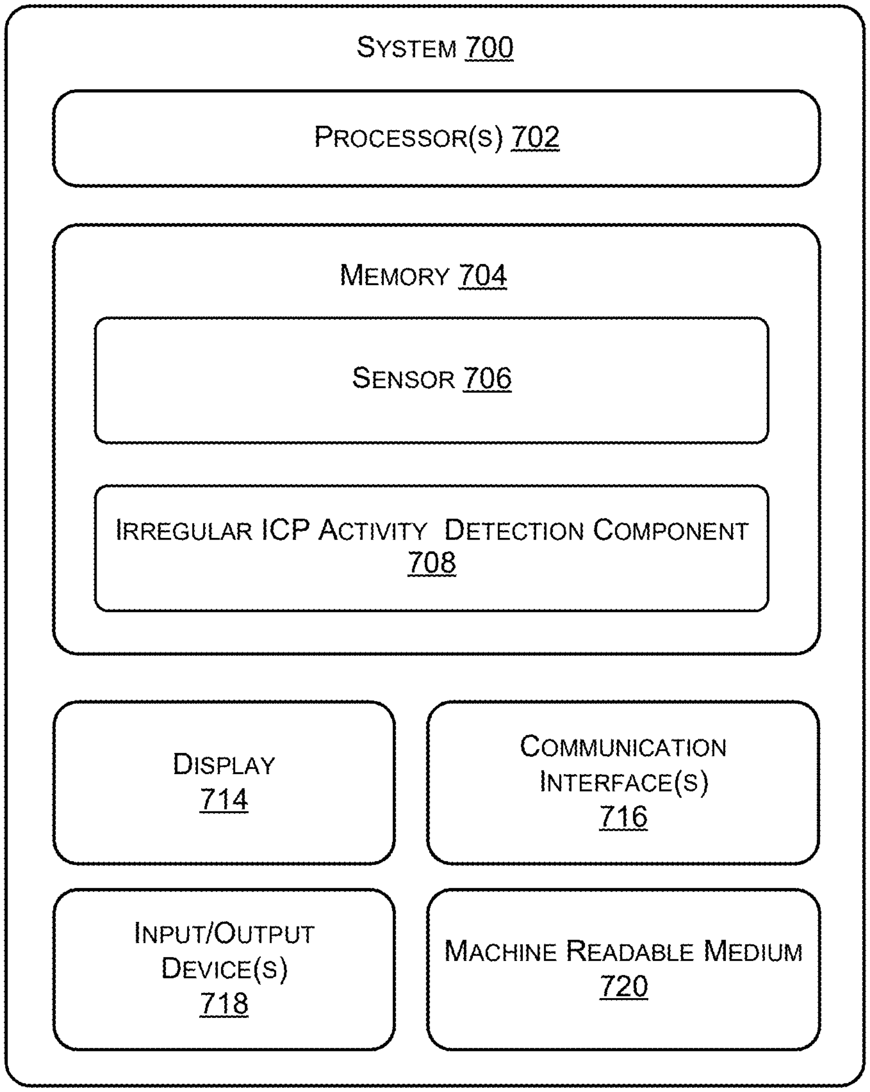
FIG. 7 illustrates an example system equipped to perform the techniques described herein, in accordance with an embodiment of the present disclosure.

FIG. 7 illustrates an example system equipped to perform the techniques described herein, in accordance with an embodiment of the present disclosure. The example system 700 can be implemented as one or more computing devices. As illustrated in FIG. 7, a system 700 may comprise processor(s) 702, a display 714, communication interface(s) 716, input/output device(s) 718, and/or a machine readable medium 720. Furthermore, the system 700 can comprise a memory 704 storing a sensor 706 or an irregular ICP activity detection component 708.

In various examples, the processor(s) 702 can be a central processing unit (CPU), a graphics processing unit (GPU), or both CPU and GPU, or any other type of processing unit. Each of the one or more processor(s) 702 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 702 may also be responsible for executing all computer applications stored in memory 704, which can be associated with common types of volatile (RAM) and/or nonvolatile (ROM) memory.

In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the system 700. Any such non-transitory computer-readable media may be part of the system 700.

The memory 704 can include module(s) which, when executed, cause the processor(s) 702 to perform actions described herein. The sensor 706 can be included when the system 700 implements, e.g., a sensor 126 such as illustrated in FIG. 1. The irregular ICP activity detection component 708 can be included when the system 700 implements, e.g., a device within the security service 130 illustrated in FIG. 1.

Display 714 can be a liquid crystal display or any other type of display commonly used in the system 700. For example, display 714 may be a touch-sensitive display screen and can then also act as an input device or keypad, such as for providing a soft-key keyboard, navigation buttons, or any other type of input. Input/output device(s) 718 can include any sort of output devices known in the art, such as display 714, speakers, a vibrating mechanism, and/or a tactile feedback mechanism. Input/output device(s) 718 can also include ports for one or more peripheral devices, such as headphones, peripheral speakers, and/or a peripheral display. Input/output device(s) 718 can include any sort of input devices known in the art. For example, input/output device(s) 718 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The communication interface(s) 716 can include transceivers, modems, interfaces, antennas, and/or other components that perform or assist in exchanging radio frequency (RF) communications with base stations of the telecommunication network, a Wi-Fi access point, and/or otherwise implement connections with one or more networks.

The machine readable medium 720 can store one or more sets of instructions, such as software or firmware, that embodies any one or more of the methodologies or functions described herein. The instructions can also reside, completely or at least partially, within the memory 704, processor(s) 702, and/or communication interface(s) 716 during execution thereof by the system 700. The memory 704 and the processor(s) 702 also can constitute machine readable media 720.

The various techniques described herein may be implemented in the context of computer-executable instructions or software, such as program components, that are stored in computer-readable storage and executed by the processor(s) of one or more computing devices such as those illustrated in the figures. Generally, program components include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, comprising:

receiving event data from a sensor deployed in a network, the event data comprising an indication of an occurrence of an interaction between a user of the network and an interactive command prompt at the network;

assigning a score to the occurrence, wherein the score is based on irregularity of the occurrence with respect to the user, wherein the score increases at a slowing rate with respect to a time elapsed since a previous occurrence of the interaction; and determining, based at least in part on the score, whether to generate an alert, wherein the alert is provided to the network and identifies the occurrence as potential malicious activity at the network.

2. The method of claim 1, wherein the amount of time elapsed since the previous instance of the occurrence is divided into historical time windows associated with different scores.

3. The method of claim 1, wherein the interaction between the user of the network and the interactive command prompt at the network comprises an entry of interaction data into the interactive command prompt.

4. The method of claim 3, wherein the score is independent of the interaction data.

5. The method of claim 1, wherein the score is further based on a different irregularity of the occurrence with respect to one or more other users of the network.

6. The method of claim 1, wherein the score is based on the irregularity of the occurrence with respect to the user and an interactive command prompt type associated with the interactive command prompt.

7. The method of claim 1, wherein the score is based on the irregularity of the occurrence with respect to the user and an access type associated with an access to the network by the user, wherein the access type can comprise a remote access type or a local access type.

8. The method of claim 1, wherein the alert is provided to the sensor deployed in the network.

9. A system, comprising:

a processor, and at least one memory storing instructions executed by the processor to perform actions including:

receiving event data comprising an indication of an occurrence of an interaction between a user and an interactive command prompt, wherein the interaction between the user and the interactive command prompt comprises an entry of interaction data into the interactive command prompt;

assigning a score to the occurrence, wherein the score is based on irregularity of the occurrence with respect to the user, wherein the score increases at a slowing rate with respect to an elapsed time since a previous occurrence of the interaction, and wherein the score is independent of the interaction data; and determining, based at least in part on the score, whether to generate an alert, wherein the alert identifies the occurrence as potential malicious activity.

10. The system of claim 9, wherein the event data is from a sensor deployed in a network, and wherein the alert is provided to the network.

11. The system of claim 9, wherein the amount of time elapsed since the previous instance of the occurrence is divided into historical time windows associated with different scores.

12. The system of claim 11, wherein historical time windows comprise time windows of different lengths.

13. The system of claim 9, wherein the score is further based on irregularity of the occurrence with respect to one or more other users.

14. The system of claim 9, wherein the score is based on irregularity of the occurrence with respect to the user and an interactive command prompt type associated with the interactive command prompt.

15. The system of claim 9, wherein the score is based on irregularity of the occurrence with respect to the user and an access type associated with the user's access to a network, wherein the access type can comprise a remote access type or a local access type.

16. A computer-readable storage medium storing computer-readable instructions, that when executed by a processor, cause the processor to perform actions comprising:

detecting, by a sensor deployed in a network, an occurrence of an interaction between a user of the network and an interactive command prompt at the network;

wherein the interaction between the user of the network and the interactive command prompt at the network comprises an entry of interaction data into the interactive command prompt;

determining whether the occurrence comprises potential malicious activity at the network, wherein the determining whether the occurrence comprises the potential malicious activity comprises assigning a score to the occurrence, wherein the score is based on irregularity of the occurrence with respect to the user, wherein the score increases at a slowing rate with respect to an elapsed time since a previous occurrence of the interaction, and wherein the score is independent of the interaction data; and generating an alert in response to a determination that the occurrence comprises the potential malicious activity at the network.

17. The computer-readable storage medium of claim 16, wherein determining whether the occurrence comprises potential malicious activity at the network further comprises sending, by the sensor, an indication of the occurrence to a cloud service and wherein the cloud service assigns the score to the occurrence.

18. The computer-readable storage medium of claim 17, wherein generating the alert comprises receiving, at the network, alert data from the cloud service.

19. The computer-readable storage medium of claim 16, wherein the amount of time elapsed since the previous instance of the occurrence is divided into historical time windows associated with different scores.

20. The computer-readable storage medium of claim 16, wherein the score is further based on irregularity of the occurrence with respect to one or more other users of the network.

* * * * *